US011212518B2

(12) United States Patent
Zhang

(10) Patent No.: US 11,212,518 B2
(45) Date of Patent: Dec. 28, 2021

(54) METHOD FOR ACCELERATING CODING AND DECODING OF AN HEVC VIDEO SEQUENCE

(71) Applicant: Shanghai Data Center Science Co., Ltd, Shanghai (CN)

(72) Inventor: Jun Zhang, Shanghai (CN)

(73) Assignee: Shanghai Data Center Science Co., Ltd, Shanghai (CN)

( * ) Notice: Subject to any disclaimer, the term of this patent is extended or adjusted under 35 U.S.C. 154(b) by 0 days.

(21) Appl. No.: 16/969,947

(22) PCT Filed: May 14, 2019

(86) PCT No.: PCT/CN2019/086747
§ 371 (c)(1),
(2) Date: Aug. 13, 2020

(87) PCT Pub. No.: WO2020/227911
PCT Pub. Date: Nov. 19, 2020

(65) Prior Publication Data
US 2021/0203919 A1 Jul. 1, 2021

(30) Foreign Application Priority Data

May 10, 2019 (CN) .......................... 201910390721.0

(51) Int. Cl.
*H04N 19/103* (2014.01)
*H04N 19/50* (2014.01)
(Continued)

(52) U.S. Cl.
CPC ........... *H04N 19/103* (2014.11); *G06N 20/00* (2019.01); *H04N 19/14* (2014.11); *H04N 19/172* (2014.11); *H04N 19/182* (2014.11); *H04N 19/50* (2014.11)

(58) Field of Classification Search
CPC .... H04N 19/103; H04N 19/14; H04N 19/172; H04N 19/182; H04N 19/50; G06N 20/00
See application file for complete search history.

(56) References Cited

U.S. PATENT DOCUMENTS

| 2013/0034169 A1* | 2/2013 | Sadafale | H04N 19/117 375/240.24 |
| 2014/0140416 A1* | 5/2014 | Yamazaki | H04N 19/82 375/240.25 |

(Continued)

FOREIGN PATENT DOCUMENTS

| CN | 104883566 A * | 5/2015 |
| CN | 104883566 A | 9/2015 |

(Continued)

OTHER PUBLICATIONS

International Search Report dated Jan. 21, 2020, issued by the International Searching Authority (ISA/CN) in connection with International Application No. PCT/CN2019/086747 (4 pages).

(Continued)

*Primary Examiner* — Zaihan Jiang
(74) *Attorney, Agent, or Firm* — McCarter & English, LLP

(57) ABSTRACT

Provided is a method for accelerating coding and decoding of an HEVC video sequence. The method includes following steps: an original video stream is decoded, a LCU and a PU1 are extracted, and the complexity of the PU1 is calculated; a block size division is performed; a quantization step QP1 of the original video stream is recorded; the decoded video stream is recoded, a quantization step QP2 of the recoded stream is set, and a CU2 of a previous frame of a frame to be coded and a CU3 of coded frames 1~N−1 are extracted; a coding unit of a frame currently being coded is obtained; a final prediction unit mode is determined according to the PU1; a division mode of the coding unit of the frame (Continued)

currently being coded is determined according to a depth information category of the coding unit of the frame currently being coded.

9 Claims, 1 Drawing Sheet

(51) Int. Cl.
*H04N 19/14* (2014.01)
*H04N 19/172* (2014.01)
*H04N 19/182* (2014.01)
*G06N 20/00* (2019.01)

(56) References Cited

U.S. PATENT DOCUMENTS

| | | | | |
|---|---|---|---|---|
| 2014/0247867 A1* | 9/2014 | Merkle | ............... | H04N 19/157 |
| | | | | 375/240.03 |
| 2014/0247871 A1* | 9/2014 | Merkle | ............... | H04N 19/23 |
| | | | | 375/240.12 |
| 2014/0247872 A1* | 9/2014 | Merkle | ............... | H04N 19/124 |
| | | | | 375/240.12 |
| 2014/0341290 A1* | 11/2014 | Merkle | ............... | H04N 19/51 |
| | | | | 375/240.16 |
| 2015/0271510 A1 | 9/2015 | Wen et al. | | |
| 2019/0311502 A1* | 10/2019 | Mammou | ............... | G01S 17/89 |
| 2020/0195923 A1* | 6/2020 | Miyagi | ............... | H04N 19/42 |
| 2020/0296356 A1* | 9/2020 | Mora | ............... | G06F 17/16 |
| 2020/0329233 A1* | 10/2020 | Nemirofsky | ......... | H04N 19/176 |
| 2020/0382795 A1* | 12/2020 | Zhang | ............... | H04N 19/513 |
| 2021/0120239 A1* | 4/2021 | Zhu | ............... | H04N 19/14 |
| 2021/0127133 A1* | 4/2021 | Chen | ............... | H04N 19/577 |

FOREIGN PATENT DOCUMENTS

| | | | |
|---|---|---|---|
| CN | 105430407 A | | 3/2016 |
| CN | 107734331 A | * | 11/2017 |
| CN | 107483931 A | | 12/2017 |
| CN | 107734331 A | | 2/2018 |

OTHER PUBLICATIONS

Chinese Office Action dated Mar. 26, 2020, issued by the State Intellectual Property Office (SIPO) in connection with Chinese Patent Application No. 201910390721.0, and English translation thereof (16 pages).

* cited by examiner

METHOD FOR ACCELERATING CODING AND DECODING OF AN HEVC VIDEO SEQUENCE

CROSS-REFERENCE TO RELATED APPLICATIONS

This is a National Stage Application, filed under 35 U.S.C. 371, of International Patent Application No. PCT/CN2019/086747, filed on May 14, 2019, which claims priority to Chinese patent application No. 201910390721.0 filed on May 10, 2019, contents of both of which are incorporated herein by reference in their entireties.

TECHNICAL FIELD

The present disclosure relates to the technical field of video coding and decoding and, in particular, to a method for accelerating coding and decoding of a High Efficiency Video Coding (HEVC) video sequence.

BACKGROUND

In the current society, information interaction is highly developed. Compared with the traditional forms such as text and pictures, information displayed by videos has the advantage of more vivid and intuitive, and thus receives wider attention. With the continuous improvement of video quality requirements of people, the second-generation video coding standard represented by H.264 has gradually failed to satisfy the compression requirements for high-definition and ultra-high-definition videos. In January 2013, International Organization for Standardization (ISO)/International Electrotechnical Commission (IEC) Moving Picture Experts Group (MPEG) and International Telecommunication Union Telecommunication Standardization Sector (ITU-T) Video Coding Experts Group (VCEG) jointly developed a new generation of video coding standard HEVC. Compared with the previous generation coding standard, HEVC exhibits significant advantages. HEVC requires only fifty percent of the original code rate in the case of the same video quality, and thus has a broad application prospect.

SUMMARY

The present disclosure provides a method for accelerating coding and decoding of an HEVC video sequence, so as to reduce coding and decoding time.

The technical scheme described below is adopted in the present disclosure.

A method for accelerating coding and decoding of an HEVC video sequence is provided. The method includes steps described below.

An original video stream is decoded to obtain a decoded video stream, a largest coding unit (LCU) and a prediction unit (PU)1 are extracted, and a gradient calculation is performed on an operable point in the LCU to obtain the variation in pixel values around a current point.

Gradient calculation results of all points in mode information of the PU1 are added up to obtain the complexity of the PU1.

A block size division is performed according to the complexity of the PU1 to obtain a coding unit (CU)1 of the decoded video stream.

A quantization step QP1 of the original video stream is recorded according to the CU1 of the original video stream and the PU1. Frames 1~N of the decoded video stream are training frames and remaining frames of the decoded video stream are accelerated frames, where 0<N<M, and M is the total number of frames of the decoded video stream.

The decoded video stream is recoded to obtain a recoded stream, a quantization step QP2 of the recoded stream is set, and a CU2 of a previous frame of a frame to be coded and a CU3 of coded frames 1~N−1 are extracted.

A coding unit of a frame currently being coded is obtained according to the CU1 of the decoded original video stream and the CU2 of the previous frame of the frame to be coded, wherein the frame currently being coded is the frame to be coded.

A final prediction unit mode is determined according to the PU1.

A division mode of the coding unit of the frame currently being coded is determined according to a depth information category of the coding unit of the frame currently being coded.

In an embodiment, the step in which adding up the gradient calculation results of all the points in the mode information of the PU1 to obtain the complexity of the PU1 includes a step described below.

Gradient values of a current pixel point in two different directions, an X direction and a Y direction, are obtained through a gradient calculation based on a sobel operator.

The gradient calculation based on the sobel operator includes steps described below.

Pixel values of three points on a left and a right of the current pixel point are weighted according to 1:2:1 and then subtraction is performed on the pixel values of the three points in sequence to obtain a gradient variation Gx in the X direction. Pixel values of three points above and below the current pixel point are weighted according to 1:2:1 and then subtraction is performed on the pixel values of the three points in sequence to obtain a gradient variation Gy in the Y direction. Gx and Gy are calculated as follows:

$$Gx = P_{i-1,j-1} + 2 \times P_{i-1,j} - P_{i+1,j-1} - 2 \times P_{i+1,j} - P_{i+1,j+1}$$

$$Gy = P_{i-1,j-1} + 2 \times P_{i,j-1} + P_{i+1,j-1} i+1, j-1 - P_{i-1,j+1} - 2 \times P_{i,j+1} - P_{i+1,j+1} \qquad (1).$$

Here, $P_{x,y}$ denotes the value of a pixel point, the subscript i denotes the positional relationship between the pixel point and a center point in the X direction and the subscript j denotes the positional relationship between the pixel point and the center point in the Y direction.

Gradient values of all the points in the PU1 are added up to obtain image complexity K of the PU1 by through the following formula (2):

$$K = \Sigma(|Gx| + |Gy|) \qquad (2).$$

In an embodiment, the step in which the coding unit of the frame currently being coded is obtained according to the CU1 of the decoded video stream and the CU2 of the previous frame of the frame to be coded includes steps described below.

The adaboost classifier is trained to obtain a trained adaboost classifier, by using following coding units as two characteristics of an adaboost classifier: a coding unit of frames 2~N of the decoded video stream and the CU2 of the previous frame of the frame to be coded, and by using the CU3 of the coded frames 1~N−1 as a training result.

Coding unit information of the frame currently being coded is obtained by using the trained classifier and taking following information as two characteristics of the classifier: coding unit information of the accelerated frames of the decoded video stream and coding unit information of the previous frame of the frame to be coded.

In an embodiment, the depth information category of the coding unit of the frame currently being coded includes category 0, category 1, category 2 or category 3.

In an embodiment, the step in which the final prediction unit mode is determined according to the PU1 includes steps described below.

A candidate list of the mode information of the PU is set, where the candidate list includes an original prediction unit mode and a 2N×2N prediction unit mode.

Rate-distortion costs of the two types of the mode information of the PU are calculated by using a rate-distortion function, and a mode with a lower rate-distortion cost is selected as a final PU mode.

In an embodiment, the step in which the rate-distortion costs of the two types of the mode information of the PU are calculated by using the rate-distortion function comprises the following formula:

$$J=D(\text{Motion})+\lambda \text{ModeR}(\text{Motion})  \quad (3).$$

Here, J denotes a rate-distortion cost, D(Motion) denotes the number of distortions in a motion mode, R(Motion) denotes the number of bits in the motion mode, and Mode denotes a Lagrange factor and is a constant.

In an embodiment, the step in which the division mode of the coding unit of the frame currently being coded is determined according to the depth information category of the coding unit of the frame currently being coded includes steps described below.

If the depth information category is category 0, a flag is set: when the size of the PU1 is 64×64, a coding unit division is not performed, and the depth information category 0 is an optimal coding unit information depth.

If the depth information category is category 1, a rate-distortion cost calculation of the size of 64×64 is skipped, and a flag is set: when the size of the PU1 is 32×32, a coding unit information division is not performed.

If the depth information category is category 2, rate-distortion cost calculations of the sizes of 64×64 and 32×32 are skipped, and a flag is set: when the size of the PU1 is 16×16, a coding unit information division is not performed.

If the depth information category is category 3, rate-distortion cost calculations of the sizes of 64×64, 32×32 and 16×16 are skipped, a flag is not set, and a coding unit information division is terminated.

In an embodiment, the value of N is 10.

In an embodiment, QP2>QP1.

Through the above technical scheme, compared with the related art, the present disclosure provides the method for accelerating coding and decoding of the HEVC video sequence. The method has the following advantages:

1) in the present disclosure, the coding calculation complexity of the CU and the coding calculation complexity of the PU are comprehensively considered, and the coding time is reduced from two aspects;
2) in the present disclosure, starting from the information included in the original code stream, the required mode information is obtained at the decoding end, and the information is processed and utilized at the coding end so that the flow is scientific and reasonable, and the method is easy to understand;
3) in the present disclosure, the experimental results are analyzed and then the CU mode and the PU mode are processed by two methods: for the CU mode, the adaboost classifier is selected to classify the CU mode of the current frame by training and learning so that the redundant calculation of the rate-distortion cost of the CU mode is avoided; for the PU mode, through the experimental data, two modes of PU size concentration are analyzed, so that the calculation complexity of the PU mode is greatly reduced;
4) when the CU mode is processed, two CU modes most relative to the frame currently being coded are selected, and information about the frame corresponding to the original code stream and information about the previous frame of the current code stream are used as the input characteristics of the adaboost classifier, so that the high accuracy of the result is ensured;
5) video coding and machine learning are combined, the selected adaboost classifier is one of the better classifiers in all machine learning methods, and the classifier has the advantages of easy implementation, low generalization error rate and no parameter adjustment; and
6) when the PU mode is processed, processing of the PU mode is divided into intra-frame processing and inter-frame processing so that time is saved in the mode determination of both types.

DETAILED DESCRIPTION

Figure 1:
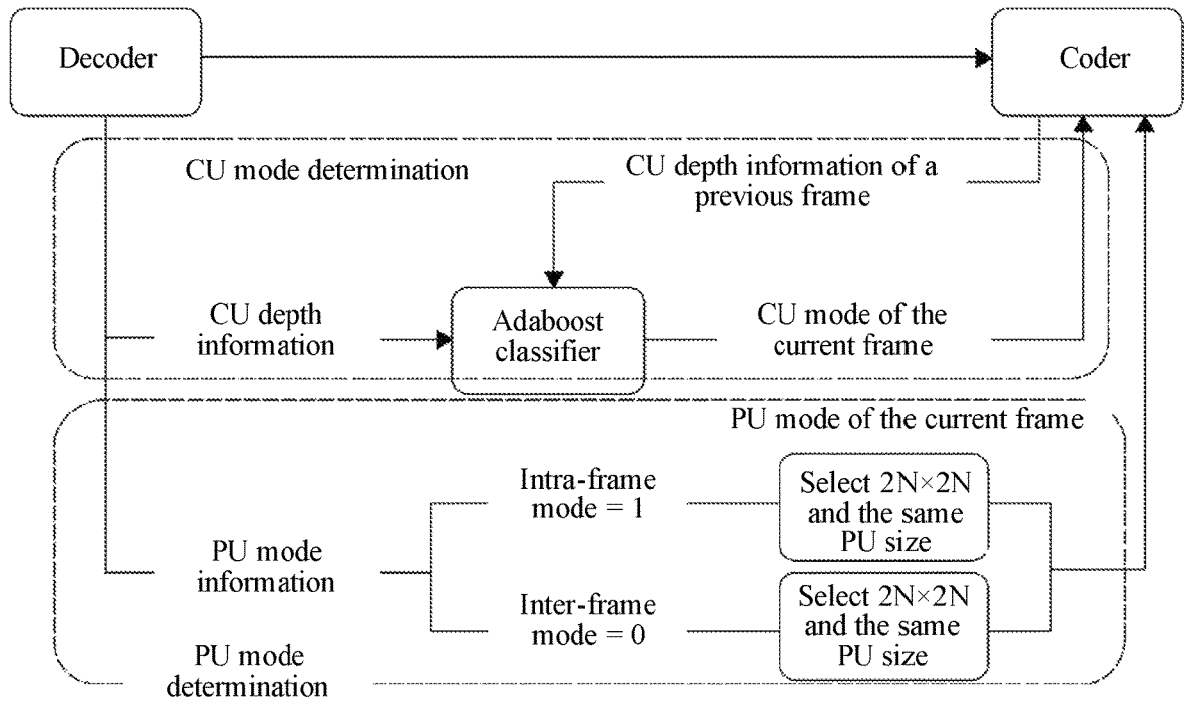
FIG. 1 is a flowchart of a method for accelerating coding and decoding of an HEVC video sequence according to the present disclosure.
Figure 2:
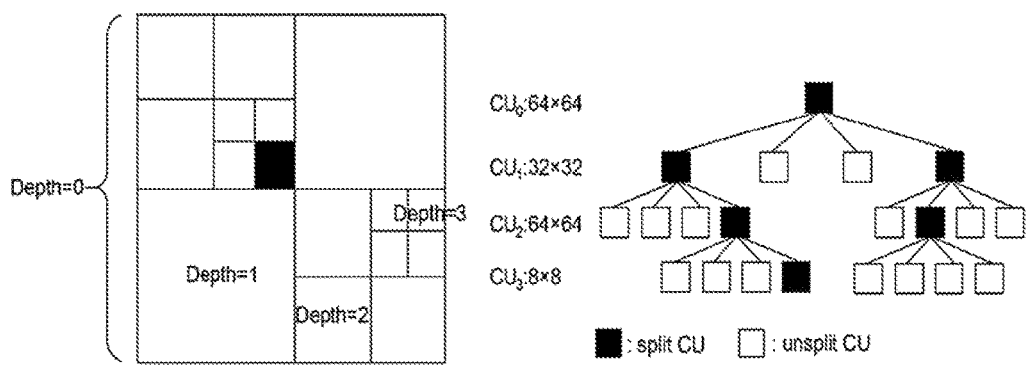
FIG. 2 is a diagram illustrating a structure division and corresponding depth of information mode of a coding unit according to the present disclosure.

The technical scheme in the embodiment of the present disclosure will be described clearly and completely hereinafter in conjunction with the drawings of the embodiment of the present disclosure. Apparently, the described embodiment is only part, not all, of embodiments of the present disclosure.

The embodiment of the present disclosure discloses a method for accelerating coding and decoding of an HEVC video sequence. The method includes steps described below.

In step 1, an original video stream is decoded, an LCU and a PU1 are extracted, and a gradient calculation is performed on an operable point in the LCU to obtain the variation in pixel values around a current point.

In step 2, gradient calculation results of all points in mode information of the PU1 are added up to obtain the complexity of the current PU1. The step 2 includes a step described below.

An image complexity of the PU1 is roughly obtained by introducing a gradient algorithm, where this step includes a step described below.

Gradient values of a current pixel point in two different directions, an X direction and a Y direction, are obtained through a calculation based on a sobel operator.

The gradient calculation based on the sobel operator includes steps described below.

Pixel values of three points on a left and a right of the current pixel point are weighted according to 1:2:1 and then subtraction is performed on the pixel values of the three points in sequence to obtain a gradient variation Gx in the X direction. Pixel values of three points above and below the current pixel point are weighted according to 1:2:1 and then subtraction is performed on the pixel values of the three points in sequence to obtain a gradient variation Gy in the Y direction. Gx and Gy are calculated as follows:

$$Gx=P_{i-1,j-1}+2\times P_{i-1,j}-P_{i+1,j-1}-2\times P_{i+1,j}-P_{i+1,j+1}$$

$$Gy=P_{i-1,j-1}+2\times P_{i,j-1}+P_{i+1,j-1}i+1,j-1-P_{i-1,j+1}-2\times P_{i,j+1}-P_{i+1,j+1} \quad (1).$$

Here, $P_{x,y}$ denotes the value of a pixel point, and the subscript i denotes the positional relationship between the pixel point and a center point in the X-axis direction, and the subscript j denotes the positional relationship between the pixel point and the center point in the Y-axis direction.

Gradient values of all the points in a certain PU1 are added up to obtain image complexity K of the current PU1 through the following formula (2):

$$K=\Sigma(|Gx|+|Gy|) \quad (2).$$

The most probable method of the block size division is obtained according to information about the image complexity. The judgment herein may be completed by an experience threshold, and a division method for judging from a large block to a small block in sequence based on the experience threshold is provided below.

Taking a 64×64 block as an example, if the image complexity of each 32×32 sub-block of the 64×64 block is less than a certain threshold value, it may be considered that the image complexity of the 64×64 block is lower so that the division does not need to be performed. In this case, 64×64 is selected as the most probable block size division. If the above condition is not satisfied, the 64×64 block is divided into four 32×32 sub-blocks, and image complexities of the four 32×32 sub-blocks are sequentially analyzed. By analogy, the division selections of 32×32, 16×16 and 8×8 blocks may be completed, and finally the most probable scheme of block size division may be obtained. The experience threshold herein is related to the image characteristics, and one probable experience threshold scheme is shown in a table shown below.

| Size of a Prediction Unit | Experience Threshold |
| --- | --- |
| 64 × 64 | 13000 |
| 32 × 32 | 5000 |
| 16 × 16 | 4000 |
| 8 × 8 | 3000 |

The image complexity of the PU1 may be rapidly obtained by the gradient algorithm, and then the block size division of one LCU may be completed according to the image complexity data to obtain the CU1 of the decoded original video stream.

In step 3, the block size division is performed according to the complexity of the current PU1 to obtain a CU1 of the decoded original video stream.

In step 4, a quantization step QP1 of the original video stream is recorded according to the CU1 of the original video stream and the PU1. Frames 1~N of the decoded video stream are training frames and remaining frames of the decoded video stream are accelerated frames, where 0<N<M, and M is the total number of frames of the decoded video stream.

In step 5, the decoded video stream is recoded, a quantization step QP2 of the recoded stream is set, and a CU2 of a previous frame of a frame to be coded and a CU3 of coded frames 1~N−1 are extracted.

In step 6, a coding unit of a frame currently being coded is obtained according to the CU1 of the decoded original video stream and the CU2 of the previous frame of the frame to be coded. The step 6 includes steps described below.

In step 6.1, the adaboost classifier is trained to obtain a trained adaboost classifier, by using following coding units as two characteristics of an adaboost classifier: a coding unit of frames 2~N of the decoded original video stream and the CU2 of the previous frame of the frame to be coded, that is, coding unit information of frames 1~N−1, and by using the CU3 of the coded frames 1~N−1 as a training result.

In step 6.2, coding unit information of the frame currently being coded is obtained by using the trained classifier and taking following information as two characteristics of the classifier: coding unit information of the accelerated frames of the decoded video stream and coding unit information of the previous frame of the frame to be coded.

The depth information category of the coding unit of the frame currently being coded includes category 0, category 1, category 2 or category 3.

In step 7, a final prediction unit mode is determined according to a decoded PU1. The step 7 includes steps described below.

In step 7.1, a candidate list of the mode information of the PU is set. The candidate list includes an original prediction unit mode and a 2N×2N prediction unit mode.

In step 7.2, rate-distortion costs of the two types of the mode information of the PU are calculated by using a rate-distortion function, and a mode with a lower rate-distortion cost is selected as the final PU mode. The formula is as below.

$$J=D(\text{Motion})+\lambda\text{ModeR}(\text{Motion}) \quad (3).$$

Here, J denotes a rate-distortion cost, D(Motion) denotes the number of distortions in a motion mode, R(Motion) denotes the number of bits in the motion mode, and Mode denotes a Lagrange factor and is a constant.

In step 8, a division mode of the coding unit of the frame currently being coded is determined according to a depth information category of the coding unit of the frame currently being coded obtained in step 6. The step 8 includes steps described below.

If the depth information category is category 0, a flag is set: when the size is 64×64, a coding unit division is not performed, and the depth information category 0 is an optimal coding unit information depth.

If the depth information category is category 1, a rate-distortion cost calculation of the size of 64×64 is skipped, and a flag is set: when the size is 32×32, a coding unit information division is not performed.

If the depth information category is category 2, rate-distortion cost calculations of the sizes of 64×64 and 32×32 are skipped, and a flag is set: when the size is 16×16, a coding unit information division is not performed.

If the depth information category is category 3, rate-distortion cost calculations of the sizes of 64×64, 32×32 and 16×16 are skipped, a flag is not set, and a coding unit information division is terminated.

In an embodiment, the value of N is 10.

The method for accelerating coding and decoding of the HEVC video sequence disclosed by the present disclosure is applicable to coding and decoding of videos with various characteristics, including different video resolution (including high resolution, medium resolution and low resolution), different video motion types (including high-speed motion, medium-speed motion and low-speed motion) and different video textures (including fine texture, coarse texture and the like).

In the present disclosure, in the same video sequence, not only the process of data extraction training is implemented, but also coding is performed by using the predicted results, that is, video training is integrated with acceleration of the coding process. The classifier does not need to be pre-trained, and the accuracy and real time of the results are ensured.

What is claimed is:

1. A method for accelerating coding and decoding of a High Efficiency Video Coding (HEVC) video sequence, comprising:
    decoding an original video stream to obtain a decoded video stream, extracting a largest coding unit (LCU) and a prediction unit (PU)1, and performing a gradient calculation on an operable point in the LCU to obtain a variation in pixel values around a current point;
    adding up gradient calculation results of all points in an inter-frame mode of the PU1 to obtain a complexity of the PU1;
    performing a block size division according to the complexity of the PU1 to obtain a coding unit (CU)1 of the decoded video stream;
    recording a quantization step QP1 of the original video stream according to the CU1 of the decoded video stream and the PU1, wherein frames 1~N of the decoded video stream are training frames and remaining frames of the decoded video stream are accelerated frames, wherein 0<N<M, and M is a total number of frames of the decoded video stream;
    recoding the decoded video stream to obtain a recoded stream, setting a quantization step QP2 of the recoded stream, and extracting a CU2 of a previous frame of a frame to be coded and a CU3 of coded frames 1~N−1;
    obtaining a coding unit of a frame currently being coded according to the CU1 of the decoded video stream and the CU2 of the previous frame of the frame to be coded, wherein the frame currently being coded is the frame to be coded;
    determining a final prediction unit mode according to the PU1; and
    determining a division mode of the coding unit of the frame currently being coded according to a depth information category of the coding unit of the frame currently being coded.

2. The method of claim 1, wherein adding up the gradient calculation results of all the points in the inter-frame mode of the PU1 to obtain the complexity of the PU1 comprises:
    obtaining gradient values of a current pixel point in two different directions, an X direction and a Y direction, through a gradient calculation based on a sobel operator, wherein the gradient calculation based on the sobel operator comprises:
        weighting, according to 1:2:1, pixel values of three points comprising the current pixel point and two points on a left and a right of the current pixel point, and then performing subtraction on the pixel values of the three points in sequence to obtain a gradient variation Gx in the X direction, and weighting, according to 1:2:1, pixel values of three points above and below the current pixel point and then performing subtraction on the pixel values of the three points in sequence to obtain a gradient variation Gy in the Y direction, wherein Gx and Gy are calculated as follows:

$$Gx = P_{i-1,j-1} + 2 \times P_{i-1,j} - P_{i+1,j-1} - 2 \times P_{i+1,j} - P_{i+1,j+1}$$

$$Gy = P_{i-1,j-1} + 2 \times P_{i,j-1} + P_{i+1,j-1} i+1, j-1 - P_{i-1,j+1} - 2 \times P_{i,j+1} - P_{i+1,j+1} \quad (1).$$

where $P_{x,y}$ denotes a value of a pixel point, the subscript i denotes a positional relationship between the pixel point and a center point in the X direction, and the subscript j denotes a positional relationship between the pixel point and the center point in the Y direction; and
    adding up gradient values of all the points in the PU1 to obtain image complexity K of the PU1 through a formula (2):

$$K = \Sigma(|Gx| + |Gy|) \quad (2).$$

3. The method of claim 1, wherein obtaining the coding unit of the frame currently being coded according to the CU1 of the decoded video stream and the CU2 of the previous frame of the frame to be coded comprises:
    training an adaboost classifier to obtain a trained adaboost classifier, by using following coding units as two characteristics of the adaboost classifier: a coding unit of frames 2~N of the decoded video stream and the CU2 of the previous frame of the frame to be coded, and by using the CU3 of the coded frames 1~N−1 as a training result; and
    obtaining coding unit information of the frame currently being coded by using the trained classifier and taking following information as two characteristics of the classifier: coding unit information of the accelerated frames of the decoded video stream and coding unit information of the previous frame of the frame to be coded.

4. The method of claim 1, wherein the depth information category of the coding unit of the frame currently being coded comprises category 0, category 1, category 2 or category 3.

5. The method of claim 1, wherein determining the final prediction unit mode according to the PU1 comprises:
    setting a candidate list of the inter-frame mode of the PU, wherein the candidate list comprises an original prediction unit mode and a 2N×2N prediction unit mode; and
    calculating rate-distortion costs of the two types of the inter-frame mode of the PU by using a rate-distortion function, and selecting a mode with a lower rate-distortion cost as the final PU mode.

6. The method of claim 5, wherein calculating the rate-distortion costs of the two types of the inter-frame mode of the PU by using the rate-distortion function comprises:

$$J = D(Motion) + \lambda Mode R(Motion) \quad (3),$$

where J denotes a rate-distortion cost, D(Motion) denotes a number of distortions in a motion mode, R(Motion) denotes a number of bits in the motion mode, and λMode denotes a Lagrange factor and is a constant.

7. The method of claim 4, wherein determining the division mode of the coding unit of the frame currently being coded according to the depth information category of the coding unit of the frame currently being coded comprises:
    in a case where the depth information category is category 0, setting a flag: when a size of the PU1 is 64×64, a coding unit division is not performed, and the depth information category 0 is an optimal coding unit information depth;
    in a case where the depth information category is category 1, skipping a rate-distortion cost calculation of a size of 64×64, and setting a flag: when a size of the PU1 is 32×32, a coding unit information division is not performed;

in a case where the depth information category is category 2, skipping rate-distortion cost calculations of sizes of 64×64 and 32×32, and setting a flag: when a size of the PU1 is 16×16, a coding unit information division is not performed; and in a case where the depth information category is category 3, skipping rate-distortion cost calculations of sizes of 64×64, 32×32 and 16×16, not setting a flag and terminating a coding unit information division.

8. The method of claim 1, wherein a value of N is 10.
9. The method of claim 1, wherein QP2>QP1.

* * * * *